US007140440B2

(12) United States Patent
Luke et al.

(10) Patent No.: US 7,140,440 B2
(45) Date of Patent: Nov. 28, 2006

(54) FLUID LOSS ADDITIVES FOR CEMENT SLURRIES

(75) Inventors: Karen Luke, Duncan, OK (US); Russell M. Fitzgerald, Velma, OK (US); Robert S. Taylor, Calgary (CA); Keith A. Rispler, Red Deer (CA); Glen C. Fyten, Red Deer (CA)

(73) Assignee: Halliburton Energy Services, Inc., Duncan, OK (US)

( * ) Notice: Subject to any disclaimer, the term of this patent is extended or adjusted under 35 U.S.C. 154(b) by 62 days.

(21) Appl. No.: 10/816,034

(22) Filed: Apr. 1, 2004

(65) Prior Publication Data

US 2004/0244977 A1 Dec. 9, 2004

Related U.S. Application Data

(63) Continuation-in-part of application No. 10/795,158, filed on Mar. 5, 2004, which is a continuation-in-part of application No. 10/738,199, filed on Dec. 17, 2003, which is a continuation-in-part of application No. 10/727,370, filed on Dec. 4, 2003, which is a continuation-in-part of application No. 10/686,098, filed on Oct. 15, 2003, now Pat. No. 6,964,302, which is a continuation-in-part of application No. 10/623,443, filed on Jul. 18, 2003, which is a continuation-in-part of application No. 10/315,415, filed on Dec. 10, 2002, now Pat. No. 6,989,057.

(51) Int. Cl.
*E21B 33/13* (2006.01)

(52) U.S. Cl. .................. 166/293; 106/805; 106/813; 507/216; 507/269

(58) Field of Classification Search ............... 166/283, 166/292, 293; 106/805, 813, 819, 823; 507/216, 269
See application file for complete search history.

(56) References Cited

U.S. PATENT DOCUMENTS

| | | | |
|---|---|---|---|
| 1,943,584 A | 1/1934 | Cross | |
| 2,094,316 A | 9/1937 | Cross | |
| 2,131,338 A * | 9/1938 | Vail | 166/292 |
| 2,349,049 A | 5/1944 | Means | |
| 2,727,001 A | 12/1955 | Rowe | |
| 2,848,051 A | 8/1958 | Williams | |
| 3,047,493 A | 7/1962 | Rosenberg | |
| 3,065,170 A * | 11/1962 | Dumbauld et al. | 507/109 |
| 3,293,040 A | 12/1966 | Shaler, Jr. et al. | |
| 3,359,225 A | 12/1967 | Weisend | 260/29.6 |
| 3,694,152 A | 9/1972 | Sersale et al. | 423/329 |
| 3,781,225 A | 12/1973 | Schwartz | |
| 3,884,302 A | 5/1975 | Messenger | |
| 3,887,385 A | 6/1975 | Quist et al. | |
| 3,888,998 A | 6/1975 | Sampson et al. | |
| 3,963,508 A | 6/1976 | Masaryk | |
| 4,054,462 A | 10/1977 | Stude | |
| 4,141,843 A | 2/1979 | Watson | |
| 4,217,229 A | 8/1980 | Watson | |
| 4,311,607 A | 1/1982 | Kaeser | |
| 4,363,736 A | 12/1982 | Block | |
| 4,368,134 A | 1/1983 | Kaeser | |
| 4,372,876 A | 2/1983 | Kulprathipanja et al. | |
| 4,435,216 A | 3/1984 | Diehl et al. | |
| 4,444,668 A | 4/1984 | Walker et al. | |
| 4,468,334 A | 8/1984 | Cox et al. | |
| 4,474,667 A | 10/1984 | Block | |
| 4,482,379 A | 11/1984 | Dibrell et al. | |
| 4,515,216 A | 5/1985 | Childs et al. | 166/293 |
| 4,515,635 A | 5/1985 | Rao et al. | 106/90 |
| 4,530,402 A | 7/1985 | Smith et al. | 166/291 |
| 4,536,297 A | 8/1985 | Loftin et al. | |
| 4,548,734 A * | 10/1985 | Chaux et al. | 516/53 |
| 4,552,591 A | 11/1985 | Millar | |
| 4,555,269 A | 11/1985 | Rao et al. | 106/90 |
| 4,557,763 A * | 12/1985 | George et al. | 106/706 |
| 4,632,186 A * | 12/1986 | Boncan et al. | 166/293 |
| 4,650,593 A | 3/1987 | SIngerland | |
| 4,676,317 A | 6/1987 | Fry et al. | 166/293 |
| 4,703,801 A | 11/1987 | Fry et al. | 166/293 |
| 4,717,488 A | 1/1988 | Seheult et al. | |
| 4,772,307 A | 9/1988 | Kiss et al. | |
| 4,784,693 A * | 11/1988 | Kirkland et al. | 106/730 |
| 4,818,288 A | 4/1989 | Aignesberger et al. | 106/90 |
| 4,888,120 A | 12/1989 | Mueller et al. | |
| 4,986,989 A | 1/1991 | Sirosita et al. | |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |

(Continued)

FOREIGN PATENT DOCUMENTS

CA 2153372 1/1996

(Continued)

OTHER PUBLICATIONS

SPE 20624 entitled "Acidization of Analcime-Cementing Sandstone, Gulf Of Mexico", by D.R. Underdown et al., dated 1990.

(Continued)

*Primary Examiner*—George Suchfield
(74) *Attorney, Agent, or Firm*—Craig W. Roddy; Hyanes & Boone L.L.P.

(57) ABSTRACT

Methods for cementing in a subterranean zone, which use a cement composition that includes zeolite, cementitious material, proportioned fluid loss control additives and a mixing fluid. Cement compositions containing proportioned fluid loss control additives, and methods of making cement compositions containing proportioned fluid loss control additives.

62 Claims, No Drawings

U.S. PATENT DOCUMENTS

| | | | |
|---|---|---|---|
| 5,151,131 A | 9/1992 | Burkhalter et al. | 106/822 |
| 5,238,064 A | 8/1993 | Dahl et al. | 166/293 |
| 5,252,554 A | 10/1993 | Mueller et al. | 507/138 |
| 5,301,752 A | 4/1994 | Cowan et al. | 166/292 |
| 5,307,876 A | 5/1994 | Cowan et al. | 166/293 |
| 5,314,022 A | 5/1994 | Cowan et al. | 166/293 |
| 5,340,860 A | 8/1994 | Brake et al. | 524/166 |
| 5,346,012 A | 9/1994 | Heathman et al. | 166/293 |
| 5,383,967 A | 1/1995 | Chase | 106/737 |
| 5,435,846 A | 7/1995 | Tatematsu et al. | 106/813 |
| 5,464,060 A | 11/1995 | Hale et al. | 166/293 |
| 5,494,513 A | 2/1996 | Fu et al. | 106/672 |
| 5,501,276 A | 3/1996 | Weaver et al. | 166/291 |
| 5,529,624 A | 6/1996 | Riegler | 106/675 |
| 5,588,489 A | 12/1996 | Chatterji et al. | |
| 5,626,665 A | 5/1997 | Barger et al. | 106/706 |
| 5,680,900 A | 10/1997 | Nguyen et al. | 166/295 |
| 5,711,383 A * | 1/1998 | Terry et al. | 175/72 |
| 5,716,910 A | 2/1998 | Totten et al. | 507/102 |
| 5,759,964 A | 6/1998 | Shuchart et al. | 507/209 |
| 5,788,762 A | 8/1998 | Barger et al. | 106/706 |
| 5,789,352 A | 8/1998 | Carpenter et al. | 507/209 |
| 5,807,810 A | 9/1998 | Blezard et al. | |
| 5,851,960 A | 12/1998 | Totten et al. | 507/118 |
| 5,866,517 A | 2/1999 | Carpenter et al. | 507/226 |
| 5,913,364 A | 6/1999 | Sweatman | 166/281 |
| 5,964,692 A * | 10/1999 | Blezard et al. | 516/59 |
| 5,990,052 A | 11/1999 | Harris | 507/214 |
| 6,060,434 A | 5/2000 | Sweatman et al. | 507/216 |
| 6,063,738 A | 5/2000 | Chatterji et al. | 507/269 |
| 6,070,664 A | 6/2000 | Dalrymple et al. | 166/281 |
| 6,138,759 A | 10/2000 | Chatterji et al. | 166/293 |
| 6,145,591 A | 11/2000 | Boncan et al. | 166/291 |
| 6,149,724 A | 11/2000 | Ulibarri et al. | |
| 6,167,967 B1 | 1/2001 | Sweatman | 166/281 |
| 6,170,575 B1 | 1/2001 | Reddy et al. | 166/293 |
| 6,171,386 B1 | 1/2001 | Sabins | 106/724 |
| 6,182,758 B1* | 2/2001 | Vijn | 166/293 |
| 6,209,646 B1 | 4/2001 | Reddy et al. | |
| 6,213,213 B1 | 4/2001 | van Batenburg | 166/300 |
| 6,230,804 B1 | 5/2001 | Mueller et al. | 166/293 |
| 6,235,809 B1 | 5/2001 | Arias et al. | 523/130 |
| 6,245,142 B1 | 6/2001 | Reddy et al. | 106/724 |
| 6,258,757 B1 | 7/2001 | Sweatman et al. | 507/219 |
| 6,283,213 B1 | 9/2001 | Chan | 166/291 |
| 6,315,042 B1 | 11/2001 | Griffith et al. | 166/291 |
| 6,372,694 B1* | 4/2002 | Osinga et al. | 507/140 |
| 6,379,456 B1 | 4/2002 | Heathman et al. | 106/724 |
| 6,390,197 B1 | 5/2002 | Maroy | |
| 6,405,801 B1 | 6/2002 | Vijn et al. | 166/293 |
| 6,409,819 B1 | 6/2002 | Ko | 106/707 |
| 6,457,524 B1* | 10/2002 | Roddy | 166/293 |
| 6,475,275 B1 | 11/2002 | Nebesnak et al. | 106/803 |
| 6,478,869 B1 | 11/2002 | Reddy et al. | 106/724 |
| 6,488,091 B1 | 12/2002 | Weaver et al. | 166/300 |
| 6,494,951 B1 | 12/2002 | Reddy et al. | 106/705 |
| 6,508,305 B1 | 1/2003 | Brannon et al. | 166/293 |
| 6,508,306 B1 | 1/2003 | Reddy et al. | 166/295 |
| 6,524,384 B1 | 2/2003 | Griffith et al. | 106/705 |
| 6,555,505 B1 | 4/2003 | King et al. | 507/202 |
| 6,565,647 B1 | 5/2003 | Day et al. | 106/813 |
| 6,566,310 B1 | 5/2003 | Chan | 507/211 |
| 6,572,698 B1 | 6/2003 | Ko | 106/772 |
| 6,610,139 B1 | 8/2003 | Reddy et al. | 106/724 |
| 6,616,753 B1 | 9/2003 | Reddy et al. | 106/718 |
| 6,626,243 B1 | 9/2003 | Boncan | 166/293 |
| 6,645,289 B1 | 11/2003 | Sobolev et al. | 106/705 |
| 6,660,080 B1 | 12/2003 | Reddy et al. | 106/724 |
| 6,702,044 B1* | 3/2004 | Reddy et al. | 175/64 |
| 6,722,434 B1 | 4/2004 | Reddy et al. | |
| 6,767,868 B1 | 7/2004 | Dawson et al. | |
| 6,832,652 B1 | 12/2004 | Dillenbeck et al. | |
| 6,840,319 B1* | 1/2005 | Chatterji et al. | 166/293 |
| 6,889,767 B1 | 5/2005 | Reddy et al. | |
| 6,964,302 B1* | 11/2005 | Luke et al. | 166/293 |
| 2001/0014651 A1 | 8/2001 | Reddy et al. | 502/408 |
| 2002/0077390 A1 | 6/2002 | Gonnon et al. | 524/42 |
| 2002/0091177 A1 | 7/2002 | Gonnon et al. | 524/5 |
| 2002/0117090 A1 | 8/2002 | Ku | 106/737 |
| 2002/0157575 A1 | 10/2002 | DiLullo et al. | 106/711 |
| 2003/0153466 A1 | 8/2003 | Allen et al. | 504/358 |
| 2003/0203996 A1 | 10/2003 | Gonnon et al. | 524/5 |
| 2004/0007162 A1 | 1/2004 | Morioka et al. | 106/714 |
| 2004/0040475 A1 | 3/2004 | Roij | 106/819 |
| 2004/0107877 A1 | 6/2004 | Getzlaf et al. | 106/813 |
| 2004/0108113 A1 | 6/2004 | Luke et al. | 166/292 |
| 2004/0112600 A1 | 6/2004 | Luke et al. | 166/295 |
| 2004/0188091 A1 | 9/2004 | Luke et al. | 166/291 |
| 2004/0188092 A1 | 9/2004 | Luke et al. | 166/291 |
| 2004/0244977 A1 | 12/2004 | Luke et al. | 166/292 |
| 2004/0262000 A1 | 12/2004 | Morgan et al. | |
| 2004/0262001 A1 | 12/2004 | Caveny et al. | |
| 2005/0000734 A1 | 1/2005 | Getzlaf et al. | 175/73 |
| 2005/0034864 A1* | 2/2005 | Caveny et al. | 166/293 |
| 2005/0133222 A1 | 6/2005 | Arias et al. | |

FOREIGN PATENT DOCUMENTS

| | | |
|---|---|---|
| EP | 0 802 253 A1 | 10/1997 |
| EP | 0 895 971 A1 | 2/1999 |
| EP | 0 1260 491 A1 | 11/2002 |
| EP | 1 428 805 A1 | 6/2004 |
| FR | 763.998 | 11/1933 |
| GB | 1469954 | 4/1977 |
| GB | 2 353 523 A | 2/2001 |
| JP | 52117316 | 1/1977 |
| JP | 6121947 | 1/1986 |
| JP | 07 003254 | 1/1995 |
| JP | 1011487 | 4/1998 |
| SU | 1373781 A | 2/1988 |
| WO | WO 98/54108 | 12/1998 |
| WO | PCT 01/070646 A1 | 9/2001 |
| WO | WO 01/70646 | 9/2001 |
| WO | WO 2005/059301 A1 | 6/2005 |

OTHER PUBLICATIONS

SPE 39595 entitled "Designing a Remedial Acid Treatment for Gulf of Mexico Deepwater Turbidite Sands Containing Zeolite Cement", by B.A. Rogers et al., dated 1998.

Paper entitled "Tectonis, fluid migration, and fluid pressure in a Deformed forearc basin, Cook Inlet, Alaska", by R.L. Bruhn et al., pp. 550-563, dated 2000.

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Komarneni et al., pp. 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali-Aggregate Expansion", by R. Sersale, pp. 404-410, dated 1987.

Paper entitled "Zeolite Crystallization In Portland Cement Concrete Due To Alkali-Aggregate Reaction", by S.A. Marfil et al., pp. 1283-1288, dated 1993.

Paper entitled "A study on the hydration rate of natural zeolite blended Cement pastes", by C.S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion exchange resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.
Paper entitled "Reuse of waste catalysts from petrochemical industries For cement substitution", by Nan Su et al., pp. 1773-1783, dated 2000.
Paper entitled "Extreme vertices design of concrete with combined Mineral admixtures", by Jian-Tong Ding et al., pp. 957-960, dated 1999.
Paper entitled "The Properties of Mortar Using Blends With Portland Cement Clinker, Zeolite Tuff and Gypsum", by Ivan Janotka, et al., pp. 105-110, dated 1995.
Paper entitled "Study on the suppression effect of natural zeolite on Expansion of concrete due to alkali-aggregate reaction", by Feng Naiqian et al., pp. 17-24, dated 1998.
Paper entitled "Comparative study of the initial surface absorption and Chloride diffusion of high performance zeolite, silica fume and PFA Concrete", by Sammy Y.N. Chan et al., pp. 293-300, dated 1999.
Paper entitled "A study on the hydration rate of natural zeolite Blended cement pastes", by C.S. Poon et al., pp. 427-432, dated 1999.
Barold Brochure entitled "Aquagel Gold Seal®" dated 2002.
Halliburton brochure entitled "CFR-2 Cement Friction Reducer" dated 1999.
Halliburton brochure entitled "CFR-3 Cement Friction Reducer" dated 1998.
Halliburton brochure entitled "D-Air 2 Anti-Foam Agent" dated 1999.
Halliburton brochure entitled Halad®-344 Fluid-Loss Additive dated 1998.
Halliburton brochure entitled "Halad®-413 Fluid-Loss Additive" dated 1999.
Halliburton brochure entitled "HR®-5 Cement Additive" dated 1998.
Halliburton brochure entitled "HR®-7 Cement Retarder" dated 1999.
Halliburton brochure entitled "MICROSAND Cement Additive" dated 1999.
Halliburton brochure entitled SSA-1 Strength-Stabilizing Agent dated 1998.
Halliburton brochure entitled "SSA-2 Coarse Silica Flour" dated 1999.
Halliburton brochure entitled "Baroid Barazan® Plus" dated 2002.
Halliburton brochure entitled "Baroid EZ-MUD® Shale Stabilizer" dated 2002.
Halliburton brochure entitled "Baroid INVERMUL® Emulsifier" dated 2002.
Halliburton brochure entitled "Baroid EZ MUL® Emulsifier" dated 2002.
Halliburton brochure entitled "Baroid EZ MUL® NTE Emulsifier" dated 2002.
Halliburton brochure entitled "Baroid GELTONE® II Viscosifer" dated 2002.
Halliburton brochure entitled "Baroid GELTONE® V Viscosifier" dated 2002.
Halliburton brochure entitled "Baroid DURATONE® HT Filtration Control Agent" dated 2002.
Paper entitled "Zeolite P In Cements: Its Potential For Immobilizing Toxic And Radioactive Waste Species," by M. Atkins, et al., dated 1994.
Powder Diffraction File, PFD, Alphabetical Indexes for Experimental Patterns, Inorganic Phases, Sets 1-52, dated 2002.
Foreign communication from a related counterpart application dated Mar. 25, 2004.
Office action from a related counterpart application dated Dec. 4, 2003.
Portland Cement Association, "Portland Cement, Concrete, and Heat of hydration", Concrete Technology Today, (1997), pp. 1-4, vol. 18, No. 2, Construction Information Services Department of the Portland Cement Association.
International Center for Materials Technology Promotion, "Special Cements and Their Production Technology: CSA Series, Hydraulic Cement Series, Oil Well Cement Series etc: Hydraulic Engineering Cement", (2003).
Foreign communication from a related counterpart application dated Nov. 25, 2004.
U.S. communication from a related counterpart application dated Jun. 25, 2004.
U.S. communication from a related counterpart application dated Sep. 10, 2004.
U.S. communication from a related counterpart application dated Nov. 9, 2004.
Foreign communication from a related counterpart application dated Aug. 23, 2004.
Foreign communication from a related counterpart application dated Jul. 28, 2005.
Office action from a related counterpart application dated Sep. 7, 2005.
Office action from a related counterpart application dated Nov. 4, 2005, U.S. Appl. No. 10/727,370.
Office action from a related counterpart application dated Nov. 7, 2005, U.S. Appl. No. 10/738,1999.
Foreign communication from a related counterpart application dated Nov. 4, 2005.
Office action, dated Dec. 27, 2005, from a related counterpart application, U.S. Appl. No. 10/816,034, filed Apr. 1, 2004.
Office Action from a related counterpart application, U.S. Appl. No. 10/623,443, filed Mar. 3, 2006.
Office Action from a related counterpart applicaiton, U.S. Appl. No. 11/126,626, filed Jun. 23, 2006.
Luke, K. et al., "Zeolite-Containing Remedial Compositions" filed Jul. 17, 2006 as U.S. Appl. No. 11/488,388.
Office action from U.S. Appl. No. 10/623,443, filed Jul. 27, 2006.
Office action from U.S. Appl. No. 11/338,485, filed Aug. 11, 2006.
Paper entitled "Zeolite P In Cements: Its Potential For Immobilizing Toxic And Radioactive Waste Species," by M. Atkins, et al., 1999, no month.

* cited by examiner

FLUID LOSS ADDITIVES FOR CEMENT SLURRIES

CROSS-REFERENCE TO RELATED APPLICATIONS

This application is a continuation-in-part of prior application Ser. No. 10/795,158 filed Mar. 5, 2004, the entire disclosure of which is incorporated herein by reference, which is a continuation-in-part of prior application Ser. No. 10/738,199 filed Dec. 17, 2003, the entire disclosure of which is incorporated herein by reference, which is a continuation-in-part of prior application Ser. No. 10/727,370 filed Dec. 4, 2003, the entire disclosure of which is incorporated herein by reference, which is a continuation-in-part of prior application Ser. No. 10/686,098 filed Oct. 15, 2003 now U.S. Pat. No. 6,964,302, the entire disclosure of which is incorporated herein by reference, which is a continuation-in-part of prior application Ser. No. 10/623,443 filed Jul. 18, 2003, the entire disclosure of which is incorporated herein by reference, and which is a continuation-in-part of prior application Ser. No. 10/315,415, filed Dec. 10, 2002 now U.S. Pat. No. 6,989,057, the entire disclosure of which is incorporated herein by reference.

BACKGROUND

The present embodiment relates generally to methods and cement compositions for cementing in a subterranean zone, and more particularly, to cement fluid loss control additives, cement compositions containing the additives, and methods of using the cement compositions.

Hydraulic cement compositions are commonly utilized in subterranean well completion and remedial operations. For example, hydraulic cement compositions are used in primary cementing operations whereby strings of pipe such as casings and liners are cemented in well bores. In performing primary cementing, a hydraulic cement composition is pumped into the annular space between the walls of a well bore and the exterior surfaces of a pipe string disposed therein. The cement composition is permitted to set in the annular space, thereby forming an annular sheath of hardened substantially impermeable cement therein, which supports and positions the pipe string in the well bore and bonds the exterior surfaces of the pipe string to the walls of the well bore. Hydraulic cement compositions are also utilized in remedial cementing operations such as plugging highly permeable zones or fractures in well bores, plugging cracks or holes in pipe strings, and the like.

Fluid loss control agents are used in cement compositions to reduce fluid loss from the cement compositions to the permeable formations or zones into or through which the cement compositions are pumped.

DESCRIPTION

In carrying out certain methods disclosed herein, cementing is performed in a subterranean zone by placing a cement composition comprising a mixing fluid, zeolite, cementitious material, and proportioned fluid loss additives (FLAs) as described herein, into the subterranean zone and allowing the cement composition to set therein.

According to exemplary methods of sealing a wellbore, a cement composition is formed by mixing a cement mix, which includes a base blend and proportioned fluid loss additives (FLAs), with a mixing fluid. The cement composition is placed in the subterranean zone and allowed to set therein. The base blend used in such methods includes zeolite and at least one cementitious material, and the proportioned FLAs include at least a first fluid loss additive having a first molecular weight and at least one second fluid loss additive having a second molecular weight that is less than the first molecular weight. The first fluid loss additive will be hereafter referred to as the "high molecular weight FLA" and the second fluid loss additive will be hereafter referred to as the "low molecular weight FLA".

According to certain methods disclosed herein, the proportionality of the FLAs can be described by a ratio. For example, the proportionality of the FLAs can be expressed as a ratio of the amounts of each FLA, where each amount is expressed as a weight percent of the total weight of the base blend (% bwob). Thus, in certain examples described herein, the proportionality of the FLAs can be described by a ratio of about 15:85, of a high molecular weight FLA to a low molecular weight FLA. In other examples, the amount of low molecular weight FLAs present in the base can be increased or decreased, with a complementary increase or decrease in the amount of high molecular weight FLAs. According to one such example, the amount of low molecular weight FLAs in the base blend decreases to about 0.75% bwob, and the amount of high molecular weight FLAs increases to about 0.25% bwob. In such an example, the proportionality of the FLAs can be described by a ratio of about 25:75 of high molecular weight FLAs to low molecular weight FLAs.

In another example, the proportionality of the FLAs can be expressed as a ratio of the amount of high molecular weight FLA(s) to the amount of low molecular weight FLA(s), irrespective of the amount each type contributes to the base blend. Thus, in certain examples described herein, the proportionality of the FLAs can be described as a ratio of about 1:5.67, meaning that the amount of low molecular weight FLAs present in the base blend is about 5.67 times the amount of high molecular weight FLAs present in the base blend. According to an example where the amount of low molecular weight FLAs present in the base blend has been decreased, such as to the 0.75% bwob described above, and the amount of high molecular weight FLAs has been increased, such as to 0.25% bwob described above, the proportionality of the FLAs can be described by a ratio of about 1:3 of high molecular weight FLAs to low molecular weight FLAs.

Yet another way to express the proportionality of the FLAs as a ratio is in terms of their molecular weights. According to certain methods, the high molecular weight FLA has a molecular weight in the range of from about 800,000 atomic mass units to about 1,200,000 atomic mass units, and the low molecular weight FLA has a molecular weight in the range of from about 100,000 atomic mass units to about 300,000 atomic mass units. Thus, in certain examples, the proportionality of the FLAs can be described as a ratio of about 12:1, meaning that the molecular weight of the high molecular weight FLA would be about 12 times the molecular weight of the low molecular weight FLA. In other examples described herein, the proportionality is described as a ratio of about 4:1, meaning that the molecular weight of the high molecular weight FLA is about 4 times the molecular weight of the low molecular weight FLA. In still other examples, the proportionality of the FLAs can be described by a ratio of about 2.66:1, meaning that the molecular weight of the high molecular weight FLA would be about 2.66 times the molecular weight of the low molecular weight FLA In carrying out other methods disclosed herein, a cement mix is prepared by forming a base blend comprising zeolite and at least one cementitious material, and mixing the base blend with proportioned fluid loss additives as described herein.

Thus, cement compositions and cement mixes as disclosed herein include proportioned fluid loss additives (FLAs). In certain exemplary compositions and mixes, the FLAs are non-ionic water based soluble polymers. According to other examples, the FLAs are hydrophobically modified non-ionic water based soluble polymers. In certain examples described herein, the FLAs are unmodified hydroxyethylcelluloses. In still other examples, the FLAs are hydrophobically modified hydroxyethylcelluloses.

Exemplary cement mixes include a base blend and proportioned fluid loss additives. The base blend includes zeolite and at least one cementitious material. The proportioned fluid loss additives are as described above, that is, at least one high molecular weight FLA and at least one low molecular weight FLA, and where the high molecular weight FLA and the low molecular weight FLA are present in the base blend in a ratio of about 1:5.67. According to certain examples, the high molecular weight FLA comprises a hydroxyethylcellulose having a molecular weight in the range of from about 800,000 atomic mass units to about 1,200,000 atomic mass units, and the low molecular weight FLA comprises a hydroxyethylcellulose having a molecular weight in the range of from about 100,000 atomic mass units to about 300,000 atomic mass units.

A variety of cementitious materials can be used in the present methods, mixes and compositions, including but not limited to hydraulic cements. Hydraulic cements set and harden by reaction with water, and are typically comprised of calcium, aluminum, silicon, oxygen, and/or sulfur. Hydraulic cements include micronized cements, Portland cements, pozzolan cements, gypsum cements, aluminous cements, silica cements, and alkaline cements. According to preferred embodiments, the cementitious material comprises at least one API Portland cement. As used herein, the term API Portland cement means any cements of the type defined and described in API Specification 10, 5$^{th}$ Edition, Jul. 1, 1990, of the American Petroleum Institute (the entire disclosure of which is hereby incorporated as if reproduced in its entirety), which includes Classes A, B, C, G, and H. According to certain embodiments disclosed herein, the cementitious material comprises Class C cement. Those of ordinary skill in the art will recognize that the preferred amount of cementitious material is dependent on the type of cementing operation to be performed.

Zeolites are porous alumino-silicate minerals that may be either a natural or manmade material. Manmade zeolites are based on the same type of structural cell as natural zeolites and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

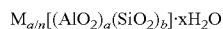

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range of from greater than or equal to 1 to less than or equal to 5; and x represents the moles of water entrained into the zeolite framework.

Preferred zeolites for use in the cement compositions prepared and used according to the present disclosure include analcime (hydrated sodium aluminum silicate), bikitaite (lithium aluminum silicate), brewsterite (hydrated strontium barium calcium aluminum silicate), chabazite (hydrated calcium aluminum silicate), clinoptilolitei (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). In exemplary cement compositions prepared and used according to the present disclosure, the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite. According to still other exemplary cement compositions described herein, the zeolite used in the cement compositions comprises clinoptilolite.

According to still other examples, in addition to proportioned fluid loss additives as described herein, the cement compositions, cement mixes and base blends described herein further comprise additives such as set retarding agents and set accelerating agents. Suitable set retarding agents include but are not limited to refined lignosulfonates. Suitable set accelerating agents include but are not limited to sodium sulfate, sodium carbonate, calcium sulfate, calcium carbonate, potassium sulfate, and potassium carbonate. Still other additives suitable for use in cement compositions comprising proportioned fluid loss additives as described herein include but are not limited to density modifying materials (e.g., silica flour, sodium silicate, microfine sand, iron oxides and manganese oxides), dispersing agents, strength retrogression control agents and viscosifying agents.

Water in the cement compositions according to the present embodiments is present in an amount sufficient to make a slurry of the desired density from the cement mix, and that is pumpable for introduction down hole. The water used to form a slurry can be any type of water, including fresh water, unsaturated salt solution, including brines and seawater, and saturated salt solution. According to some examples, the water is present in the cement composition in an amount of about 22% to about 200% by weight of the base blend of a cement mix. According to other examples, the water is present in the cement composition in an amount of from about 40% to about 180% by weight of the base blend of a cement mix. According to still other examples, the water is present in the cement composition in an amount of from about 90% to about 160% by weight of the base blend of a cement mix.

The following examples are illustrative of the methods and compositions discussed above.

EXAMPLE 1

The following describes exemplary cement compositions comprising proportioned fluid loss control additives as described herein, and the efficacy of such proportioned fluid loss control additives in such compositions.

Nine cement compositions (Nos. 1–9) comprising proportioned fluid loss control additives were prepared from the ingredients described in Table 1A.

Proportioned fluid loss additives (FLAs) were also dry-mixed into the base blends used for cement composition Nos. 1–9. In the examples illustrated in Table 1A, the proportioned fluid loss additives were Carbitron 20 and FWCA, which were dry-mixed into the base blend in the amounts (% bwob) as listed in Table 1A. Carbitron 20 is an unmodified non-hydrophobic hydroxyethylcellulose (HEC) having a molecular weight of about 225,000 atomic mass units, (amu), and is commercially available from Dow

TABLE 1A

|  | No. 1 | No. 2 | No. 3 | No. 4 | No. 5 | No. 6 | No. 7 | No. 8 | No. 9 |
|---|---|---|---|---|---|---|---|---|---|
| Base Blend | | | | | | | | | |
| Cement (wt %) | 60 | 60 | 60 | 60 | 60 | 60 | 60 | 60 | 60 |
| Zeolite (wt %) | 40 | 40 | 40 | 40 | 40 | 40 | 40 | 40 | 40 |
| Additive | | | | | | | | | |
| $Na_2CO_3$ (% bwob) | 2.2 | 0 | 0 | 2.2 | 0 | 0 | 2.2 | 0 | 0 |
| $Na_2SO_4$ (% bwob) | 4.4 | 0 | 0 | 4.4 | 0 | 0 | 4.4 | 0 | 0 |
| HR-5 (% bwob) | 0 | 0 | 1 | 0 | 0 | 1 | 0 | 0 | 0 |
| Carbitron 20 (% bwob) | 0.85 | 0.85 | 0.85 | 0.85 | 0.85 | 0.85 | 0.85 | 0.85 | 0.85 |
| FWCA (% bwob) | 0.15 | 0.15 | 0.15 | 0.15 | 0.15 | 0.15 | 0.15 | 0.15 | 0.15 |
| Mixing Fluid | | | | | | | | | |
| Water (% bwob) | 94.59 | 94.59 | 94.59 | 126.53 | 126.53 | 126.53 | 150.45 | 150.45 | 150.45 |
| D-Air 3000L (1/sk) | 0.328 | 0.328 | 0.328 | 0.328 | 0.328 | 0.328 | 0.328 | 0.328 | 0.328 |
| Density | | | | | | | | | |
| ($kg/m_3$) | 1500 | 1500 | 1500 | 1400 | 1400 | 1400 | 1350 | 1350 | 1350 |

Cement composition Nos. 1–9 were prepared according to procedures described in API Specification RP 10B, $22^{nd}$ edition, 1997, of the American Petroleum Institute, the entire disclosure of which is incorporated herein by reference. Generally, the procedure involved preparing a base blend by dry-mixing a cementitious material and zeolite by hand in a glass jar.

The amount of zeolite and cement comprising the base blend is as described in Table 1A, where "wt %" indicates the weight percent contributed to the total weight of the base blend. The cementitious material used in each base blend was Class C. Clinoptilolite, which is commercially available from C2C Zeolite Corporation of Calgary, Canada, was used as the zeolite in each base blend.

Sodium carbonate and sodium sulfate, in the amounts listed in Table 1A, where "% bwob" indicates a percentage based on the total weight of the base blend, were dry-mixed into the base blends of those compositions that were to undergo fluid loss testing at temperatures equal to or less than about 30° C. (i.e., Nos. 1, 4 and 7) to accelerate the set of the cement at such temperatures.

HR-5, which is the tradename for a retarder comprising a refined lignosulfonate commercially available from Halliburton Energy Services, was dry-mixed into the base blends of cement composition Nos. 3 and 6 in the amount (% bwob) listed in Table 1A. The retarder served to slow the set time that would otherwise occur at the conditions (density and fluid loss test temperature) of the compositions.

Chemical. FWCA is an unmodified non-hydrophobic hydroxyethylcellulose (HEC) having a molecular weight of about 1,000,000 amu, and is commercially available from Halliburton Energy Services.

The respective cement-zeolite base blends, and any accelerating additives, retarders, and proportioned fluid loss additives, comprised cement mixes from which cement composition Nos. 1–9 were formed.

Each cement composition was formed by adding the cement mix to a mixing fluid being maintained in a Waring blender at 4000 RPM. The cement mix was added to the mixing fluid over a 15 second period. When all of the cement mix was added to the mixing fluid, a cover was placed on the blender and mixing was continued at about 12,000 RPM for about 35 seconds. For each cement composition, the mixing fluid included water in the amounts as indicated in Table 1A. In certain compositions, the mixing fluid also included D-Air 3000L as reported in Table 1A. The amount of water is reported in Table 1A as a % bwob, and the amount of D-Air 3000L is reported in "1/sk", which indicates liters of D-Air 3000L per sack of cement composition. D-Air 3000L is the tradename for a defoaming agent comprising polypropylene glycol, particulate hydrophobic silica and a liquid diluent, which is commercially available from Halliburton Energy Services, Duncan, Okla. The cement mix temperature and mixing fluid temperature were both 24° C. (75° F.).

Cement composition Nos. 1–9 illustrate cement compositions comprising proportioned fluid loss additives (FLAs). The proportionality of the FLAs can be expressed as a ratio of the amounts of each FLA, where each amount is expressed as a weight percent of the total weight of the base blend (% bwob). Thus, in this Example 1, the proportionality of the FLAs, expressed as a ratio of the amounts (% bwob) of each type of FLA, can be described by a ratio of about 15:85, of a high molecular weight FLA to a low molecular weight FLA. In other examples, the amount of low molecular weight FLAs present in the base can be increased or decreased, with a complementary increase or decrease in the amount of high molecular weight FLAs. According to one such example, the amount of low molecular weight FLAs in the base blend decreases to about 0.75% bwob, and the amount of high molecular weight FLAs increases to about 0.25% bwob. In such an example, the proportionality of the FLAs can be described by a ratio of about 25:75 of high molecular weight FLAs to low molecular weight FLAs.

The proportionality of the FLAs can also be expressed as a ratio of the amount of high molecular weight FLA(s) to the amount of low molecular weight FLA(s), irrespective of the amount each type contributes to the base blend. Thus, in this Example 1, the proportionality of the FLAs can be described as a ratio of about 1:5.67, meaning that the amount of low molecular weight FLAs present in the base blend is about 5.67 times the amount of high molecular weight FLAs present in the base blend. According to an example where the amount of low molecular weight FLAs present in the base blend has been decreased, such as to the 0.75% bwob described above, and the amount of high molecular weight FLAs has been increased, such as to 0.25% bwob described above, the proportionality of the FLAs can be described by a ratio of about 1:3 of high molecular weight FLAs to low molecular weight FLAs.

Yet another way to express the proportionality of the FLAs is in terms of their molecular weights. Thus, in this Example 1, where the high molecular weight FLA comprises an unmodified non-hydrophobic hydroxyethylcellulose (HEC) having a molecular weight of about 1,000,000 atomic mass units (amu) and the low molecular weight FLA comprises an unmodified non-hydrophobic HEC having a molecular weight of about 225,000 amu, the proportionality of the FLAs can be described as a ratio of about 4:1, meaning that the molecular weight of the high molecular weight FLA(s) present in the base blend is about 4 times the molecular weight of the low molecular weight FLA(s) in the base blend. In other examples, the molecular weight of the low molecular weight FLAs can be in the range of from about 100,000 amu to about 300,000 amu, while the molecular weight of the high molecular weight FLA can be in the range or from about 800,000 amu to about 1,200,000 amu. Thus, according to an example where the high molecular weight FLA has a molecular weight of about 1,200,000 amu and the low molecular weight FLA about 100,000 amu, the proportionality of the FLAs can be described by a ratio of about 12:1, meaning that the molecular weight of the high molecular weight FLA is about 12 times the molecular weight of the low molecular weight FLA. In an example where the high molecular weight FLA has a molecular weight of about 800,000 amu and the low molecular weight FLA has a molecular weight of about 300,000 amu, the proportionality of the FLAs can be described by a ratio of about 2.66:1, meaning that the molecular weight of the high molecular weight is about 2.66 times the molecular weight of the low molecular weight FLA.

Referring now to Table 1B, rheological data and fluid loss measurements of cement composition Nos. 1–9 are reported.

TABLE 1B

| | | Rheological Data | | | | | | | | API Fluid Loss Test | API Fluid Loss |
|---|---|---|---|---|---|---|---|---|---|---|---|
| | | Dial Readings (cp) | | | | | | | | | |
| No. | Temp. (° C.) | 600 rpm | 300 rpm | 200 rpm | 100 rpm | 60 rpm | 30 rpm | 6 rpm | 3 rpm | Temperature ° C.(° F.) | (mL/30 min) |
| 1 | 30 | n/a | 196 | 145 | 89 | 65 | 47 | 34 | 32 | 30(86) | 84 |
| 2 | 50 | 245 | 175 | 131 | 84 | 62 | 43 | 21 | 18 | 50(122) | 76 |
| 3 | 80 | 99 | 60 | 39 | 22 | 15 | 10 | 7 | 6 | 80(176) | 100 |
| 4 | 30 | 157 | 101 | 75 | 47 | 34 | 25 | 19 | 18 | 30(86) | 134 |
| 5 | 50 | 105 | 66 | 48 | 28 | 19 | 12 | 5 | 4 | 50(122) | 150 |
| 6 | 80 | 57 | 38 | 23 | 12 | 7 | 5 | 4 | 2 | 80(176) | 176 |
| 7 | 30 | 108 | 65 | 46 | 26 | 21 | 15 | 10 | 8 | 30(86) | 227 |
| 8 | 50 | 57 | 36 | 25 | 15 | 10 | 6 | 1 | 0.5 | 50(122) | 243 |
| 9 | 80 | 54 | 36 | 30 | 25 | 17 | 11 | 8 | 7 | 80(176) | 364 |

The rheological data was determined using a Fann Model 35 viscometer. The viscosity was taken as the measurement of the dial reading on the Farm Model 35 at the different rotational speeds as indicated in 600 to 3 RPM, and at the temperatures as indicated in Table 1B. There are a number of theoretical models known to those of ordinary skill in the art that can be used to convert the values from the dial readings at the different RPM's into viscosity (centipoises). In addition, different viscometer models use different RPM values, thus, in some instances, a measurement is not available at a particular RPM value.

The rheological data was determined according to the procedures set forth in Section 12 of the API Specification RP 10B, 22nd Edition, 1997, of the American Petroleum Institute (the entire disclosure of which is hereby incorporated as if reproduced in its entirety). The foregoing API procedure was modified in that the initial reading at 300 RPM was taken after 60 seconds continuous rotation at that speed. Dial readings at 200, 100, 60, 30, 6 and 3 were then recorded in descending order at 20-second intervals. The final reading at 600 RPM was taken after 60 seconds continuous rotation at that speed.

The fluid loss testing was conducted according to procedures set forth in Section 10 of API Recommended Practice 10B, $22^{nd}$ Edition, 1997, of the American Petroleum Institute (the entire disclosure of which is hereby incorporated as if reproduced in its entirety).

The procedures followed were those for testing at temperatures less than 1940F, with atmospheric pressure conditioning, and a static fluid loss cell. Generally, however, 475 cc of each composition was placed into the container of an atmospheric pressure consistometer commercially available from Howco. The temperatures of the compositions were adjusted to the test temperatures indicated in Table 1B, (30, 50 and 80° C.). The test temperatures were arbitrarily chosen, based on values that are often encountered as bottom hole circulating temperatures (BHCTs) of a variety of types of wells.

After about 20 minutes, the composition to be tested was stirred, and a 5 inch standard fluid loss cell, which was prepared according to the aforemetioned Section 10 of API Recommended Practice 10B, was filled. The test was started within 30 seconds of closing the cell by application of nitrogen applied through the top valve. Filtrate was collected and the volume and time were recorded if blow out occurred in less than 30 minutes or volume recorded at 30 minutes if no blow out occurred. Thus, to determine the fluid loss data reported in Table 1B, values were calculated as twice the volume of filtrate multiplied by 5.477 and divided by the square root of time if blowout occurred, and as twice the volume of filtrate if blowout did not occur within 30 minutes.

The measured fluid loss values (mL of fluid lost/30 min) of cement composition Nos. 1–9 illustrate that proportioned fluid loss additives provide effective fluid loss control to cement compositions having a variety of densities, and at temperatures at least up to 80° C. (176° F.). In addition, the Theological data of cement composition Nos. 1–9 is within acceptable parameters.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

The invention claimed is:

1. A method of cementing in a subterranean zone comprising:
    forming a cement composition by mixing a cement mix comprising a base blend and proportioned fluid loss additives with a mixing fluid,
        which base blend comprises zeolite in an amount of at least 20 weight percent and at least one cementitious material, and
        which proportioned fluid loss additives comprise at least a first fluid loss additive having a first molecular weight and at least a second fluid loss additive having a second molecular weight,
            which second molecular weight is less than the first molecular weight, and
            which first fluid loss additive is present in an amount that is less than the amount of the second fluid loss additive;
    placing the cement composition into the subterranean zone; and
    allowing the cement composition to set therein.

2. The method of claim 1 wherein the zeolite is represented by the formula:

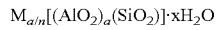

where M represents one or more cations selected from the group consisting of Na, K, Mg, Ca, Sr, Li, Ba, $NH_4$, $CH_3NH_3$, $(CH_3)_3NH$, $(CH_3)_4N$, Ga, Ge and P; n represents the cation valence; the ratio of b:a is in a range from greater than or equal to 1 and less than or equal to 5; and x represents the moles of water entrained into the zeolite framework.

3. The method of claim 1 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

4. The method of claim 1 wherein the base blend comprises from about 20 to about 60 weight percent zeolite.

5. The method of claim 1 wherein the base blend comprises about 40 weight percent zeolite.

6. The method of claim 1 wherein the first molecular weight is about twelve times as much as the second molecular weight.

7. The method of claim 1 wherein the first molecular weight is about four times as much as the second molecular weight.

8. The method of claim 1 wherein the first molecular weight is about 2.66 times as much as the second molecular weight.

9. The method of claim 1 wherein the first molecular weight is in the range of from about 800,000 atomic mass units to about 1,200,000 atomic mass units, and the second fluid loss additive comprises a hydroxyethylcellulose having a molecular weight in the range of from about 100,000 atomic mass units to about 300,000 atomic mass units.

10. The method of claim 1 wherein the first molecular weight is about 1,000,000 atomic mass units and the second molecular weight is about 225,000 atomic mass units.

11. The method of claim 1 wherein the first fluid loss additive is present in the cement mix in an amount of at least about 0.15% by weight of the base blend, and the second fluid loss additive is present in the cement mix in an amount of at least about 0.85% by weight of the base blend.

12. The method of claim 1 wherein the first fluid loss additive is present in the cement mix in an amount of at least about 0.25% by weight of the base blend, and the second fluid loss additive is present in the cement mix in an amount of at least about 0.75% by weight of the base blend.

13. The method of claim 1 wherein the first fluid loss and the second fluid loss additive are present in the base blend in a ratio of about 1:3.

14. The method of claim 1 wherein the proportioned fluid loss additives comprise non-ionic water based soluble polymers.

15. The method of claim 1 wherein the proportioned fluid loss additives comprise hydrophobically modified non-ionic water based soluble polymers.

16. The method of claim 1 wherein the proportioned fluid loss additives comprise hydroxyethylcelluloses.

17. The method of claim 1 wherein the proportioned fluid loss additives comprise hydrophobically modified hydroxyethylcelluloses.

18. The method of claim 1 wherein the first fluid loss additive comprises a hydroxyethylcellulose having a molecular weight in the range of from about 800,000 atomic mass units to about 1,200,000 atomic mass units, and the second fluid loss additive comprises a hydroxyethylcellulose having a molecular weight in the range of from about 100,000 atomic mass units to about 300,000 atomic mass units.

19. The method of claim 18 wherein the first molecular weight is about 1,000,000 atomic mass units and the second molecular weight is about 225,000 atomic mass units.

20. The method of claim 1 wherein the mixing fluid comprises water.

21. The method of claim 20 wherein the mixing fluid further comprises a defoaming agent.

22. The method of claim 1 wherein the water is present in a range of about 22% to about 200% by weight of the base blend.

23. The method of claim 1 wherein the water is present in a range of about 40% to about 180% by weight of the base blend.

24. The method of claim 1 wherein the water is present in a range of about 90% to about 160% by weight of the base blend.

25. The method of claim 1 wherein the base blend comprises at least one cementitious material selected from the group consisting of micronized cement, Portland cement, pozzolan cement, gypsum cement, aluminous cement, silica cement, and alkaline cement.

26. The method of claim 1 wherein the cement composition formed has a density in a range of from about 1350 kg/m³ to about 1500 kg/m³.

27. The method of claim 1 wherein the cement composition further comprises at least one accelerating additive.

28. The method of claim 27 wherein the at least one accelerating additive is selected from the group consisting of sodium sulfate, sodium carbonate, calcium sulfate, calcium carbonate, potassium sulfate, and potassium carbonate.

29. The method of claim 27 wherein the least one accelerating additive is present in an amount of about 0.5% to about 10% by weight of the base blend.

30. The method of claim 29 wherein the accelerating additive is present in the cement mix in an amount of from about 2% to about 8% by weight of the base blend.

31. The method of claim 1 wherein the first fluid loss and the second fluid loss additive are present in the base blend in a ratio of about 1:5.67.

32. A method of cementing in a subterranean zone comprising:
  placing a cement composition into a subterranean zone; and
  allowing the cement composition to set therein,
  wherein the cement composition comprises a base blend, proportioned fluid loss additives, and a mixing fluid,
    which base blend comprises zeolite in an amount of at least about 20 weight percent, and cementitious material;
    which proportioned fluid loss additives comprise at least a first fluid loss additive having a first molecular weight and at least a second fluid loss additive having a second molecular weight, which second molecular weight is less than the first molecular weight, and
    which second fluid loss additive is present in an amount that is at least about three times greater than the amount of the first fluid loss additive.

33. The method of claim 32 wherein the zeolite is represented by the formula:

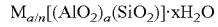

where M represents one or more cations selected from the group consisting of Na, K, Mg, Ca, Sr, Li, Ba, NH$_4$, CH$_3$NH$_3$, (CH$_3$)$_3$NH, (CH$_3$)$_4$ N, Ga, Ge and P; n represents the cation valence; the ratio of b:a is in a range from greater than or equal to 1 and less than or equal to 5; and x represents the moles of water entrained into the zeolite framework.

34. The method of claim 32 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

35. The method of claim 32 wherein the first molecular weight is at least about 2.66 times as much as the second molecular weight.

36. The method of claim 32 wherein the first molecular weight is in the range of from about 800,000 atomic mass units to about 1,200,000 atomic mass units, and the second molecular weight is in the range of from about 100,000 atomic mass units to about 300,000 atomic mass units.

37. The method of claim 32 wherein the first fluid loss additive is present in an amount of at least about 0.15% by weight of the base blend, and the second fluid loss additive is present in an amount of at least about 0.85% by weight of the base blend.

38. The method of claim 32 wherein the first fluid loss additive is present in an amount of at least about 0.25% by weight of the base blend, and the second fluid loss additive is present in an amount of at least about 0.75% by weight of the base blend.

39. The method of claim 32 wherein the proportioned fluid loss additives are selected from the group consisting of non-ionic water based soluble polymers, hydrophobically modified non-ionic water based soluble polymers, hydroxyethylcelluloses and hydrophobically modified hydroxyethylcelluloses.

40. The method of claim 32 wherein the first fluid loss additive comprises a hydroxyethylcellulose having a molecular weight in the range of from about 800,000 atomic mass units to about 1,200,000 atomic mass units, and the second fluid loss additive comprises a hydroxyethylcellulose having a molecular weight in the range of from about 100,000 atomic mass units to about 300,000 atomic mass units.

41. The method of claim 32 wherein the mixing fluid comprises water.

42. The method of claim 41 wherein the mixing fluid further comprises a defoaming agent.

43. The method of claim 32 wherein the base blend comprises at least one cementitious material selected from the group consisting of micronized cement, Portland cement, pozzolan cement, gypsum cement, aluminous cement, silica cement, and alkaline cement.

44. The method of claim 32 wherein the cement composition further comprises at least one accelerating additive.

45. The method of claim 44 wherein the at least one accelerating additive is selected from the group consisting of sodium sulfate, sodium carbonate, calcium sulfate, calcium carbonate, potassium sulfate, and potassium carbonate.

46. A method of cementing in a subterranean zone comprising:
  placing a cement composition into a subterranean zone; and
  allowing the cement composition to set therein,
  wherein the cement composition comprises a base blend, proportioned fluid loss additives, and a mixing fluid,
    which base blend comprises zeolite in an amount of at least about 20 weight percent and cementitious material; and
    which proportioned fluid loss additives comprise at least a first fluid loss additive having a first molecular weight and at least a second fluid loss additive having a second molecular weight, which second molecular weight is less than the first molecular weight, and wherein the second fluid loss additive is present in an amount that is greater than the amount of the first fluid loss additive.

47. The method of claim 46 wherein the zeolite is represented by the formula:

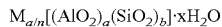

$$M_{a/n}[(AlO_2)_a(SiO_2)_b] \cdot xH_2O$$

where M represents one or more cations selected from the group consisting of Na, K, Mg, Ca, Sr, Li, Ba, $NH_4$, $CH_3NH_3$, $(CH_3)_3NH$, $(CH_3)4$ N, Ga, Ge and P; n represents the cation valence; the ratio of b:a is in a range from greater than or equal to 1 and less than or equal to 5; and x represents the moles of water entrained into the zeolite framework.

48. The method of claim 46 wherein the zeolite is selected from the group consisting of analcime, bikitaite, brewsterite, chabazite, clinoptilolite, faujasite, harmotome, heulandite, laumontite, mesolite, natrolite, paulingite, phillipsite, scolecite, stellerite, stilbite, and thomsonite.

49. The method of claim 46 wherein the base blend comprises from about 20 to about 60 weight percent zeolite.

50. The method of claim 46 wherein the base blend comprises about 40 weight percent zeolite.

51. The method of claim 46 wherein the first molecular weight is at least about 2.66 times as much as the second molecular weight.

52. The method of claim 46 wherein the first fluid loss additive is present in an amount of at least about 0.15% by weight of the base blend, and the second fluid loss additive is present in an amount of at least about 0.85% by weight of the base blend.

53. The method of claim 46 wherein the first fluid loss additive is present in an amount of at least about 0.25% by weight of the base blend, and the second fluid loss additive is present in an amount of at least about 0.75% by weight of the base blend.

54. The method of claim 46 wherein the first fluid loss additive and the second fluid loss additive are present in the base blend in a ratio of about 1:5.67.

55. The method of claim 46 wherein the proportioned fluid loss additives comprise non-ionic water based soluble polymers or hydrophobically modified non-ionic water based soluble polymers.

56. The method of claim 46 wherein the proportioned fluid loss additives comprise hydroxyethylcelluloses or hydrophobically modified hydroxyethylcelluloses.

57. The method of claim 46 wherein the mixing fluid comprises water.

58. The method of claim 57 wherein the mixing fluid further comprises a defoaming agent.

59. The method of claim 46 wherein the base blend comprises at least one cementitious material selected from the group consisting of micronized cement, Portland cement, pozzolan cement, gypsum cement, aluminous cement, silica cement, and alkaline cement.

60. The method of claim 46 wherein the cement composition further comprises at least one accelerating additive.

61. The method of claim 60 wherein the at least one accelerating additive is selected from the group consisting of sodium sulfate, sodium carbonate, calcium sulfate, calcium carbonate, potassium sulfate, and potassium carbonate.

62. The method of claim 60 wherein the accelerating additive is present in an amount of from about 0.5% to about 10% by weight of the base blend.

* * * * *